US010143940B2

(12) United States Patent
Kim et al.

(10) Patent No.: US 10,143,940 B2
(45) Date of Patent: Dec. 4, 2018

(54) SEPARATING APPARATUS FOR NANOPARTICLES AND SEPARATING APPARATUS USING THE SAME

(71) Applicant: KOREA INSTITUTE OF MACHINERY & MATERIALS, Daejeon (KR)

(72) Inventors: Duck Jong Kim, Daejeon (KR); So Hee Jeong, Daejeon (KR); Won Seok Chang, Daejeon (KR); Chang-Su Woo, Daejeon (KR); Ho Sub Lim, Daejeon (KR); Ju Young Woo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 278 days.

(21) Appl. No.: 14/953,078

(22) Filed: Nov. 27, 2015

(65) Prior Publication Data
US 2016/0220924 A1 Aug. 4, 2016

(30) Foreign Application Priority Data

Feb. 4, 2015 (KR) .......................... 10-2015-0017559
Nov. 4, 2015 (KR) .......................... 10-2015-0154658

(51) Int. Cl.
*B01D 17/06* (2006.01)
(52) U.S. Cl.
CPC .................................. *B01D 17/06* (2013.01)
(58) Field of Classification Search
None
See application file for complete search history.

(56) References Cited

U.S. PATENT DOCUMENTS 2,116,509 A * 5/1938 Cottrell .................. B01D 17/06
204/514

FOREIGN PATENT DOCUMENTS

| AU | 2008205431 | 3/2009 |
|---|---|---|
| AU | 2008207611 | 3/2009 |
| JP | 4383845 | 7/2005 |
| JP | 2009-274041 | 11/2009 |
| KR | 20-0177618 | 4/2000 |
| KR | 10-2009-0023148 | 3/2009 |
| KR | 10-1331027 | 11/2013 |
| KR | 10-2013-0141077 | 12/2013 |
| KR | 10-2014-0038815 | 3/2014 |

(Continued)

*Primary Examiner* — Arun S Phasge
(74) *Attorney, Agent, or Firm* — Lex IP Meister, PLLC

(57) ABSTRACT

A nanoparticle separating apparatus that can separate nanoparticles from impurities in a nanoparticle dispersion, and a nanoparticle separating method using the same are disclosed. The nanoparticle separating apparatus according to an exemplary embodiment of the present invention includes: a body portion having an inlet hole into which a dispersion flows formed in one side thereof, an outlet hole through which the waste solution from which nanoparticles are separated flows formed in the other side, and a hollow channel formed between the inlet hole o and the outlet hole; a first electrode and a second electrode, each having a porous structure where a plurality of pores are formed, and at least one pair of the first and second electrodes being provided in the channel; and a power supply applying voltages, each having a different polarity, to the first electrode or to the second electrode.

13 Claims, 10 Drawing Sheets

(56) References Cited

FOREIGN PATENT DOCUMENTS

KR  10-1404158 B  5/2014
KR  10-1408191    7/2014

* cited by examiner

SEPARATING APPARATUS FOR NANOPARTICLES AND SEPARATING APPARATUS USING THE SAME

CROSS-REFERENCE TO RELATED APPLICATION

This application claims priority to and the benefit of Korean Patent Application No. 10-2015-0017559 and 10-2015-0154658 filed in the Korean Intellectual Property Office on Feb. 4, 2015 and Nov. 4, 2015, the entire contents of which are incorporated herein by reference.

BACKGROUND OF THE INVENTION (a) Field of the Invention

The present invention relates to an apparatus for separating nanoparticles, and more particularly, it relates to a nanoparticle separating apparatus that can separate nanoparticles from impurities in a nanoparticle dispersion, and a nanoparticle separation method thereof.

(b) Description of the Related Art

As a technology that composes, assembles, and controls a material of an atom-sized or molecule-sized unit and measures and studies properties of the material, nanotechnology refers to a technology for a material or an object of a 1 to 100 nanometer range in size, in general.

Such a nanotechnology material has unique optical/chemical features due to the size of a nanoparticle, and the nanotechnology has been applied to various fields since it also has excellent mechanical/electrical features. Particularly, the nanotechnology has been applied to various fields including electronic and communication fields, material/manufacturing fields, a medical field, a biotechnology field, an environment/energy field, and an aviation field.

As stated above, industrial utilization of the excellent features of the nanoparticle has been regularized, and accordingly, a process for massive synthesis of nanoparticles in a liquid state has been actively researched and developed.

However, when the nanoparticles are synthesized, a material that has been injected for synthesis and experienced no reaction or a reaction has been stopped in the middle of a process remains as an impurity and thus a separation process should be performed to remove the impurity, to thereby highlight a unique feature of the nanoparticles. Conventionally, a method of iteratively performing a process for collecting nanoparticles by precipitation and redistributing the collected nanoparticles has been used, but such a method is not environmental-friendly because it causes a waste of a massive amount of organic solvent for iterative redistribution, and the method is not industrially suitable due to a deviation in separation caused by different workers and different work environments.

In order to solve such a problem, a method for moving nanoparticles from a stream of as-synthesized nanoparticle dispersion to a stream of a desired solvent using an electrophoretic method has been suggested, but the nanoparticles cannot be wholly separated.

Meanwhile, a method for installing a minute electrode in a channel, attaching nanoparticles to a surface of the minute electrode using an electrophoretic method, and then redistributing the attached nanoparticles to a desired solvent has been suggested (Korean Patent No. 10-1404158). However, such a method has a manufacturing process problem in down-sizing a cross-section of the minute electrode to increase a specific surface area and has a limit in mechanical durability of the minute electrode. Further, since the nanoparticles need to be moved and attached in a direction that is perpendicular to a length direction of the channel, the channel should have a sufficient length for processing a massive amount of nanoparticles, and accordingly, equipment cannot be down-sized.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a nanoparticle separating apparatus that can easily separate nanoparticles from impurities in a nanoparticle dispersion, and a nanoparticle separating method using the same.

A nanoparticle separating apparatus according to an exemplary embodiment of the present invention includes: a body portion having an inlet hole into which a nanoparticle dispersion flows formed in one side thereof, an outlet hole through which the waste solution from which nanoparticles are separated flows formed in the other side, and a hollow channel formed between the inlet hole and the outlet hole; a first electrode and a second electrode, each having a porous structure where a plurality of pores are formed, and at least one pair of the first and second electrodes being provided in the channel; and a power supply applying voltages, each having a different polarity, to the first electrode or to the second electrode.

The first electrode and the second electrode may be made of a metal foam. The metal foam may be made of at least one of copper (Cu), nickel (Ni), aluminum (Al), and stainless steel.

The size of pores in the first electrode and the second electrode may be greater than the size of nanoparticles included in the nanoparticle dispersion.

The first electrode and the second electrode may be respectively provided in plural, and the first electrodes and the second electrodes may be alternately arranged.

The nanoparticle separating apparatus may further include an ultrasonic wave generator giving ultrasonic vibration to the first electrode or the second electrode.

The body portion may include a plurality of layered unit support plates, and each of the unit support plates may be provided with a perforated opening to form the channel.

The unit support plate may include an electrode member insertion groove formed in an area including the opening, and an electrode member of the first electrode or an electrode member of the second electrode may be installed to the electrode member insertion groove.

The nanoparticle separating apparatus may further include a spacer formed to surround an outer edge of the electrode member insertion groove and an O-ring fitted into a groove that forms a closed curved line along the edge of the spacer.

The electrode member of the first electrode and the electrode member of the second electrode may have porous structures where a plurality of pores are formed in portions corresponding to the openings.

The unit support plates may include a first unit support plate where the electrode member of the first electrode is installed and a second electrode unit support plate where the electrode member of the second electrode is installed, and the electrode member of the first electrode and the electrode member of the second electrode respectively may include protrusions protruding toward opposite directions with respect to the opening.

The first electrode unit support plate and the second electrode unit plate support may be respectively provided in plural, and the first electrode unit support plates and the second electrode unit support plates may be alternately arranged.

The nanoparticle separating apparatus may include a first electrode holder connecting the protrusions of the electrode members of the first electrodes and a second electrode holder connecting the protrusions of the electrode members of the second electrodes.

The body portion may include a first connection block having an inlet at one outermost side of the plurality of layered unit support plates, and a second connection bock having an outlet at the other outermost side.

According to another exemplary embodiment of the present invention, a nanoparticle separating method using a nanoparticle separating apparatus that includes a porous first electrode and a porous second electrode in a channel is provided. The nanoparticle separating method includes: supplying a nanoparticle dispersion to the channel; attaching nanoparticles to the first electrode and the second electrode by applying a first voltage to the first electrode and a second voltage to the second electrode, the first voltage and the second voltage having polarities opposite to each other; and collecting the nanoparticles attached to the first and second electrodes by supplying a solvent to the channel for redistribution.

The collecting may include separating the nanoparticles attached to the first and second electrodes by applying a third voltage to the first electrode and a fourth voltage to the second electrode, wherein the third voltage has an opposite polarity to the first voltage and the fourth voltage has an opposite polarity to the second electrode.

The collecting may include separating the nanoparticles attached to the first and second electrodes by giving ultrasonic vibration to the first electrode or the second electrode.

The nanoparticle separating method may further include washing to remove impurities by flowing a washing solution to the channel.

According to the above-stated exemplary embodiments of the present invention, nanoparticles can be easily separated from impurities in a nanoparticle dispersion using an electrophoretic method.

In addition, a specific surface area can be increased by using porous electrodes, thereby improving separation efficiency, durability of electrodes is good, a massive separation of nanoparticles can be performed, and equipment can be down-sized.

Further, nanoparticles attached to the electrode can be more completely and stably collected.

DETAILED DESCRIPTION OF THE EMBODIMENTS

Figure 1:
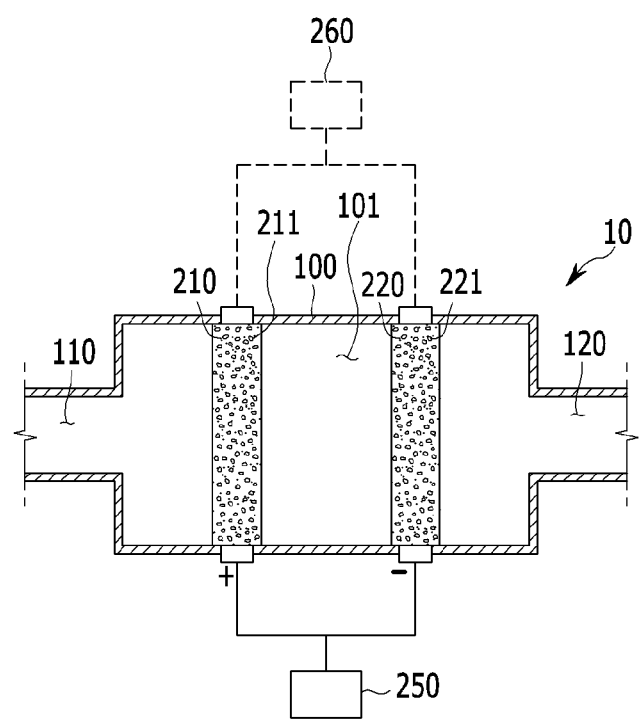
FIG. 1 is a schematic diagram of a nanoparticle separating apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In addition, the size and thickness of each configuration shown in the drawings are arbitrarily shown for better understanding and ease of description, but the present invention is not limited thereto.

Further, unless explicitly described to the contrary, the word "comprise" and variations such as "comprises" or "comprising" will be understood to imply the inclusion of stated elements but not the exclusion of any other elements.

Figure 2:
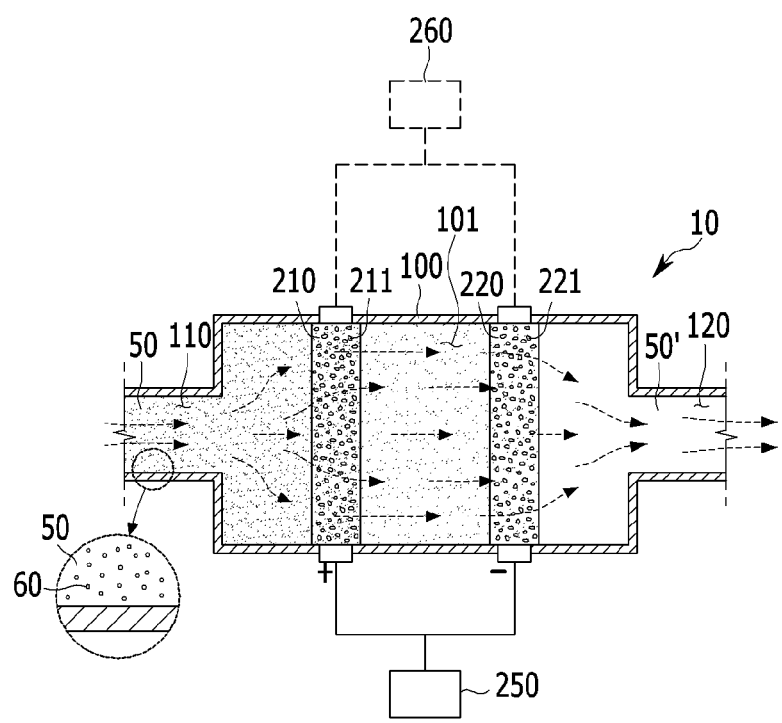
FIG. 2 is a schematic diagram illustrating a nanoparticle dispersion flowing through a channel in FIG. 1.
Figure 3:
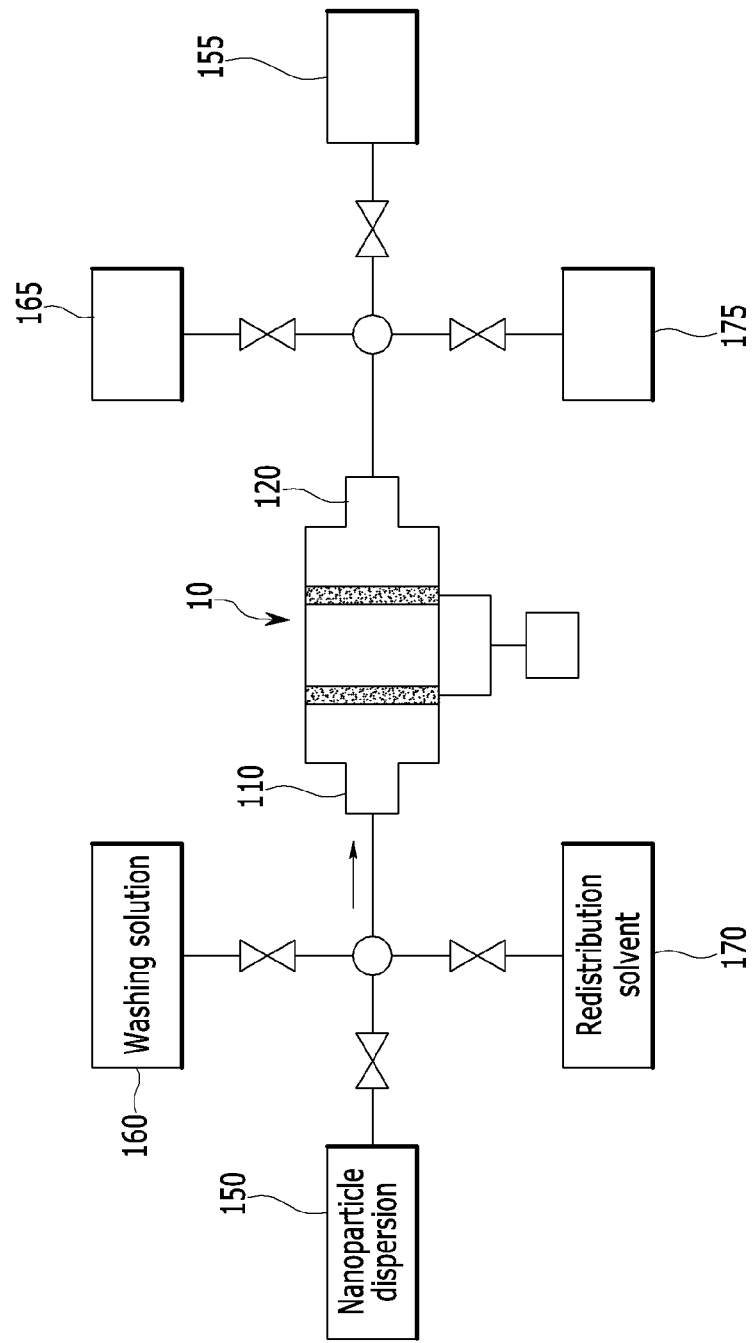
FIG. 3 is a schematic view illustrating a connection state of a nanoparticle dispersion supply, a washing solution supply, and a redispersion solvent supply to a nanoparticle separating apparatus according to another exemplary embodiment of the present invention.

A nanoparticle separating apparatus according to the present invention can separate nanoparticles from impurities in a nanoparticle dispersion, and one exemplary embodiment thereof is shown in FIG. 1 to FIG. 3.

FIG. 1 is a schematic diagram of a nanoparticle separating apparatus 10 according to an exemplary embodiment of the present invention, and FIG. 2 is a schematic diagram of the nanoparticle dispersion flowing through a channel in FIG. 1.

A nanoparticle separating apparatus 10 according to an exemplary embodiment of the present invention includes a body portion 100 having a channel 101 through which a nanoparticle dispersion 50 passes, first and second electrodes 210 and 220 provided in the channel 101, and a power supply 250 applying a voltage to the first electrode 210 and the second electrode 220.

First, an inflow hole 110 through which the nanoparticle dispersion 50 flows is provided in one side of the body portion 100, an outlet hole 120 through which a solution 50' from which nanoparticles are separated flows is formed in the other side of the body portion 100, and the nanoparticle dispersion 50 passes through the channel 101 that connects the inlet hole 110 and the outlet hole 120.

The first electrode 210 and the second electrode 220 are conductive blocks, and each has a porous structure where a plurality of pores 211 and 221 are formed. The plurality of pores 211 and 221 may be formed in parallel with a flow direction of the nanoparticle dispersion 50. At least one of the above-stated porous-structured first and second electrodes 210 and 220 is provided, and the first and second electrodes 210 and 220 are spatially separated from each other in the channel 101.

Since the first electrode 210 and the second electrode 220 have large specific surfaces because of the porous structure, separation efficiency of nanoparticles 60 can be improved compared to a simple flat-structured electrode.

The power supply 250 may alternately apply a negative voltage or a positive voltage to the first electrode 210 or to the second electrode 220.

For example, when the nanoparticle dispersion 50 passes through the channel 101, the power supply 250 applies a positive voltage to the first electrode 210 and applies a negative voltage to the second electrode 220 such that electrophoresis is generated, and accordingly the nanoparticles 60 are attached to the surfaces of the first and second electrodes 210 and 220. In this case, a voltage may be sequentially alternately applied to the first electrode 210 and to the second electrode 220. Alternatively, a voltage may be simultaneously applied to the first electrode and the second electrode 220.

When the first electrode 210 and the second electrode 220 are applied with voltages each having a different polarity, nanoparticles 60 may be selectively attached to the first electrode 210 or the second electrode 220 according to properties of the attached nanoparticles 60.

Next, the nanoparticles 60 attached to the surface of the first electrode 210 or the second electrode 220 can be collected through a redistribution method by injecting a desired solution into the channel 101

According to another exemplary embodiment of the present invention, the nanoparticles 60 attached to the surfaces of the first and second electrodes 210 and 220 may be naturally redistributed to the solution, and a voltage having the opposite polarity of that of the voltage that has been applied when the nanoparticles 60 are attached is applied from the power supply 250 to thereby surely detach the nanoparticles 60 attached to the first and second electrodes 210 and 220 such that the nanoparticles 60 can be redistributed.

Meanwhile, according to another exemplary embodiment of the present invention, an ultrasonic wave generator 260 may be additionally included. The ultrasonic wave generator 260 selectively gives ultrasonic vibration to the first electrode 210 and the second electrode 220 in the channel 101 to redistribute the nanoparticles 60 attached to the porous first and second electrodes 210 and 220.

For the redistribution of the nanoparticles 60, one of conversion of polarity of a voltage applied to each of the first and second electrodes 210 and 220 and giving ultrasonic vibration using the ultrasonic wave generator 260 may be selectively applied or both of the two methods may be applied.

According to the other exemplary embodiment of the present invention, a washing solution may flow into the channel 101 to remove impurities before redistribution of the nanoparticles 60 attached to the first and second electrodes 210 and 220.

FIG. 3 is a schematic view illustrating a nanoparticle dispersion supply 150, a washing solution supply 160, and a redistribution solvent supply 170 connected to a nanoparticle separating apparatus 10 according to another exemplary embodiment of the present invention.

Referring to FIG. 3, the nanoparticle dispersion supply 150, the washing solution supply 160, and the redistribution solvent supply 170 are connected to an inlet hole 110 of a nanoparticle separating apparatus 10 according to another exemplary embodiment of the present invention. The nanoparticle dispersion supply 150 may supply the nanoparticle dispersion 50 to the inlet hole 110 of the channel 101, the washing solution supply 160 may supply a washing solution, and the redistribution solvent supply 170 may supply a redistribution solvent. Each of the supplies 150, 160, and 170 may control injection of the nanoparticle dispersion, the washing solution, or the redistribution solvent by driving a pump or controlling opening and closing of a valve. Thus, the nanoparticle dispersion-washing solution-redistribution solvent can be sequentially supplied to the nanoparticle separating apparatus 100 by sequentially driving the nanoparticle dispersion supply 150, the washing solution supply 150, and the redistribution solvent supply 170. The nanoparticle dispersion supply 150, the washing solution supply 160, and the redistribution solvent supply 170 are connected to the nanoparticle separating apparatus 10 such that a nanoparticle separating system can be formed.

A waste solution collecting portion 155, a washing solution collecting portion 165, and a solvent collecting portion 175 may be connected to an outlet hole 120 of the nanoparticle separating apparatus 10 according to the present exemplary embodiment. The waste solution collecting portion 155 may collect a waste solution 50' discharged to the outlet 120 of the channel 10, the washing solution collecting portion 156 may collect the washing solution, and the solvent portion 175 may collect the redistribution solvent.

According to another exemplary embodiment of the present invention, the first electrode 210 and the second electrode 220 may be made of a metal foam among various materials that meet a condition of porous conductive blocks. Further, a metal foam made of a metal formed of copper (Cu), nickel (Ni), aluminum (Al), or stainless steel may be selected.

The metal foam includes plurality of pores. Such a metal foam has various and useful features such as lightweightedness, energy absorbing ability, heat insulation, fire resistance, environment friendliness, and the like. Particularly, the metal foam having a fine structure where nano-sized pores and micro-sized pores exist together is a high-functional and high-value added material that has a high specific surface area and can further improve flow of a fluid such as a liquid, a gas, and the like, or electrons, and thus when the metal foam is being adopted as a material of the first electrode 210 and the second electrode 220, separation efficiency of the nanoparticles 60 can be improved. The nano-sized pores may have nanometer scale diameter, and the micro-sized pores may have micrometer scale diameter.

According to another exemplary embodiment of the present invention, pores 211 and 221 formed in the first and second electrodes 210 and 220 are greater than the size of the nanoparticle 60 to prevent the pores 211 and 221 from being stuck.

Figure 4:
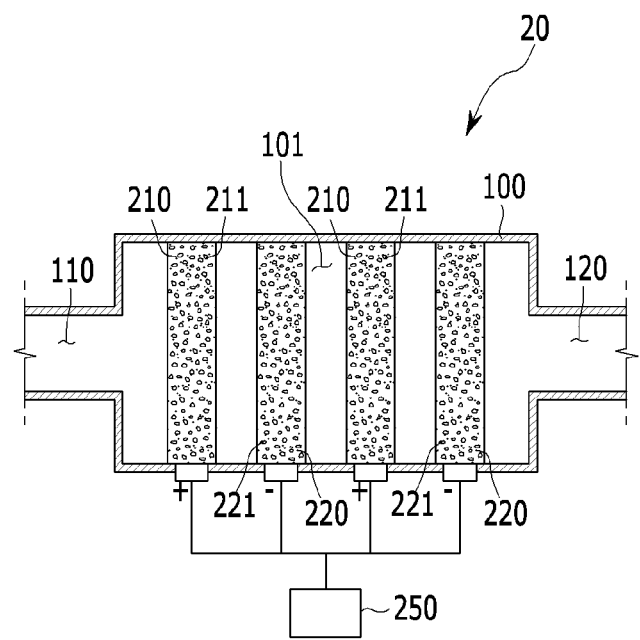
FIG. 4 is a schematic diagram of the nanoparticle separating apparatus according to the other exemplary embodiment of the present invention.

FIG. 4 is a schematic diagram of a nanoparticle separating apparatus according to another exemplary embodiment of the present invention.

Referring to FIG. 4, a nanoparticle separating apparatus 20 according to the present exemplary embodiment includes a plurality of first electrodes 210 and a plurality of second electrodes 220 that are alternately arranged in a channel 101. The plurality of first electrodes 210 and the plurality of second electrodes 220 are spatially separated from each other, and are connected to a power supply 250 and receive a positive voltage or a negative voltage therefrom.

A nanoparticle separating method according the present invention is a process for separating nanoparticles from impurities in a nanoparticle dispersion, and an exemplary embodiment thereof will now be described with reference to FIG. 5 and FIG. 6.

Figure 5:
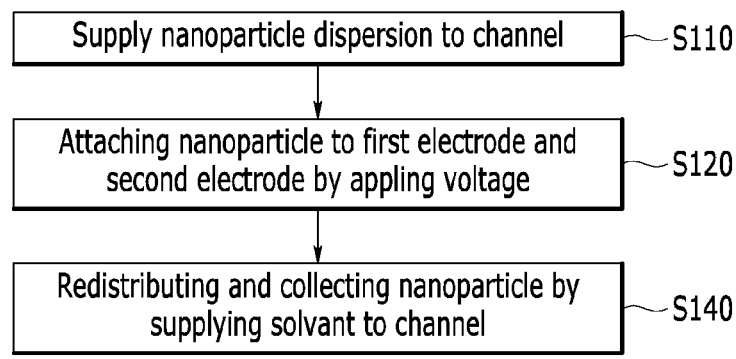
FIG. 5 is a schematic process flowchart of a nanoparticle separating method according to an exemplary embodiment of the present invention.
Figure 6:
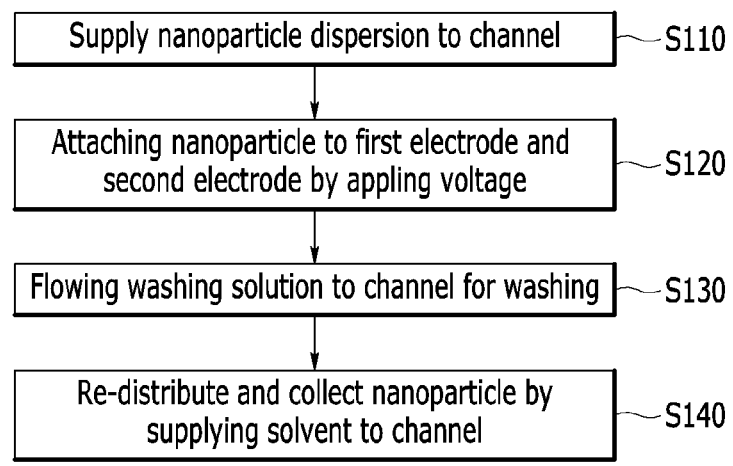
FIG. 6 is a schematic process flowchart of a nanoparticle separating method according to another exemplary embodiment of the present invention.

FIG. 5 is a schematic process flowchart of a nanoparticle separating method according to an exemplary embodiment of the present invention, and FIG. 6 is a schematic process flowchart of a nanoparticle separating method according to another exemplary embodiment of the present invention.

A nanoparticle separating method according to an exemplary embodiment of the present invention includes supplying a nanoparticle dispersion 50 to a channel 101 (S110), attaching nanoparticles 60 to a first electrode 210 and a second electrode 220 through an electrophoretic method by applying a positive voltage to the first electrode 210 and a negative voltage to the second electrode 220 through a power supply 250 (S130), and redistributing the nanoparticles 60 by collecting the nanoparticles 60 attached to the first and second electrodes 210 and 220 by supplying a solvent to the channel (S140).

As in S120, the first electrode 210 is applied with the positive voltage and the second electrode 220 is applied with the negative voltage when the nanoparticle dispersion 50 passes through the channel 101, and then the nanoparticles 60 can be selectively attached to the first electrode 210 or the second electrode 220 according to properties of the nanoparticles 60. Next, the nanoparticles 60 attached to the surfaces of the first and second electrodes 210 and 220 may be collected by injecting a desired solvent to the channel 101 through the collecting for redistribution (S140).

According to the above-stated exemplary embodiment of the present invention, the nanoparticles 60 can be easily separated from the impurities in a nanoparticle dispersion 50 by using the electrophoretic method, and specific surface areas are increased by using the porous electrodes 210 and 220, thereby increasing separation efficiency and downsizing equipment. Further, the nanoparticles 60 attached to the electrodes 210 and 220 can be more stably collected.

According to another exemplary embodiment of the present invention, in S140, a negative voltage is applied to the first electrode 210 and a positive voltage is applied to the second electrode 220 through the power supply 250 such that the nanoparticles 60 attached to the first electrode 210 and the second electrode 220 can be separated.

In S120, the nanoparticles 60 attached to the first electrode 210 and the second electrode 220 may be naturally redistributed to a flowing solvent, but in order to more completely separate the nanoparticles 60 from the first and second electrodes 210 and 220, voltages applied to the first electrode 210 and the second electrode 220 may be opposite in polarity to the voltages that were supplied in S120.

That is, since the positive voltage is applied to the first electrode 210 and the negative voltage is applied to the second electrode 220 in S120, a negative voltage is applied to the first electrode 210 and a positive voltage is applied to the second electrode 220 in S140 such that the nanoparticles 60 attached to the surfaces of the first and second electrodes 210 and 220 are forcibly separated from the first and second electrodes 210 and 220 for redistribution.

Meanwhile, as shown in FIG. 6, in another exemplary embodiment of the present invention, between S120 and S140, washing (S130) may be additionally performed and thus a washing solution is passed through the channel 101 so as to completely remove residual impurities in the inner surface of the channel 101 or the first and second electrodes 210 and 220 before redistributing the nanoparticles 60 attached to the first and second electrodes 210 and 220.

Figure 7:
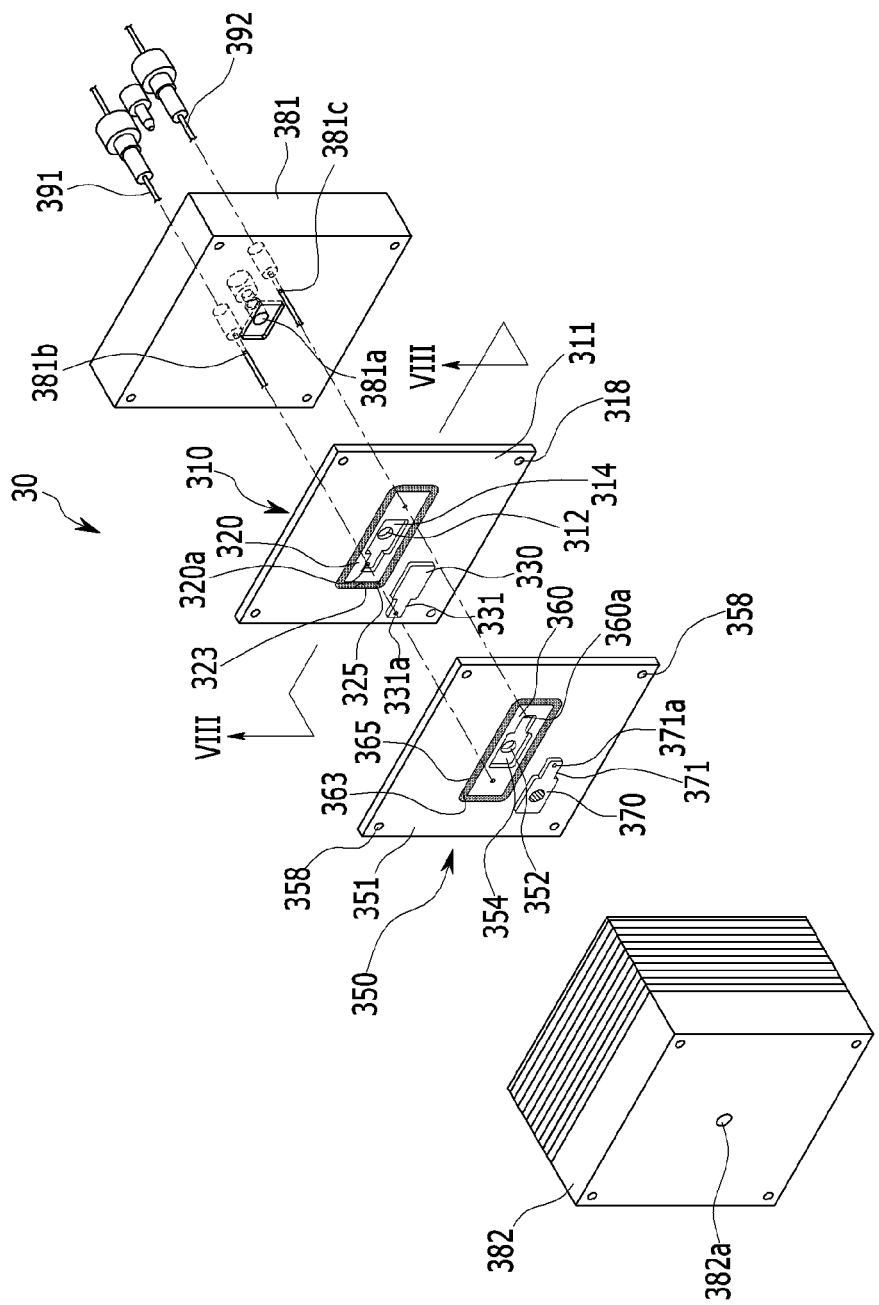
FIG. 7 is an exploded perspective view of a nanoparticle separating apparatus according to another exemplary embodiment of the present invention.

FIG. 7 is an exploded perspective view of a nanoparticle separating apparatus according to another exemplary embodiment of the present invention.

Referring to FIG. 7, in a nanoparticle separating apparatus 30 according to the present exemplary embodiment, a plurality of unit support plates 310 and 350 are layered and first and second connection blocks 381 and 382 are engaged to lateral ends of the layered unit support plates 310 and 350. Electrode member insertion grooves 314 and 354 having perforated openings 312 and 352 are provided in center portions of the unit support plates 310 and 350, and additionally prepared electrode members 330 and 370 may be installed in the electrode member insertion grooves 314 and 354.

The electrode members 330 and 370 respectively provided in the unit support plate 310 and 350 include protrusions 331 and 371, which are one ends of the electrode members 330 and 370 protruded by being extended, and spacers 320 and 360 are provided to surround outer edges of the electrode members 330 and 370. Grooves 323 and 363 are formed while forming closed curved lines along the edges of the spacers 320 and 360. O-rings 325 and 365 are fitted into the grooves 323 and 363, and supports 311 and 351 that support the electrode members 330 and 370 while forming outer shapes of the unit support plates 310 and 350 are formed in the outer sides of the grooves 323 and 363. The supports 311 and 351 and the spacers 320 and 360 may be integrally formed with the same material, and may be made of an insulation material. For example, the supports 311 and 351 and the spacers 320 and 360 may be made of polytetrafluoroethylene (PTFE). Each of the supports 311 and 351 may substantially have a quadrangular plane shape, and through-holes 318 and 358 may be formed around four edges of each quadrangle. The through-holes 318 and 358 may be provided around at least two corners of the four corners of each quadrangle.

The unit support plates 310 and 350 include a negative unit support plate 310 connected to a negative electrode and a positive unit support plate 350 connected to a positive electrode. The negative unit support plate 310 and the positive unit support plate 350 are alternately layered, and each unit support plate rotate 180 degrees with respect to the openings 312 and 352 when the negative and positive unit support plates 310 and 350 are alternately layered such that the protrusions 331 and 371 of the electrode members 330 and 370 respectively face opposite to each other. With respect to the openings 312 and 352, engaging holes 331a, 371a, 320a, and 360a are respectively formed for engaging electrode holders 391 and 392 in portions of the protrusions 331 and 371 of the electrode members 330 and 370 and in portions of the spacers 320 and 360 located in the opposite directions thereof. Thus, the electrode holder 391 of the negative electrode can connect the electrode members 330 of the negative unit support plates 310, and the electrode holder 392 of the positive electrode can connect the electrode members 370 of the positive unit support plates 350.

The electrode members 330 and 370 include porous conductive block portions where a plurality of pores are formed, and the porous conductive block portions may be, for example, made of a metal foam. In the present exemplary embodiment, the porous conductive block portions may be formed in portions in the electrode members 330 and 370 corresponding to the openings 312 and 352 of the unit support plates 310 and 350, and other portions may be non-porous.

Alternatively, the electrode members 330 and 370 may be wholly made of porous conductive blocks.

Figure 8:
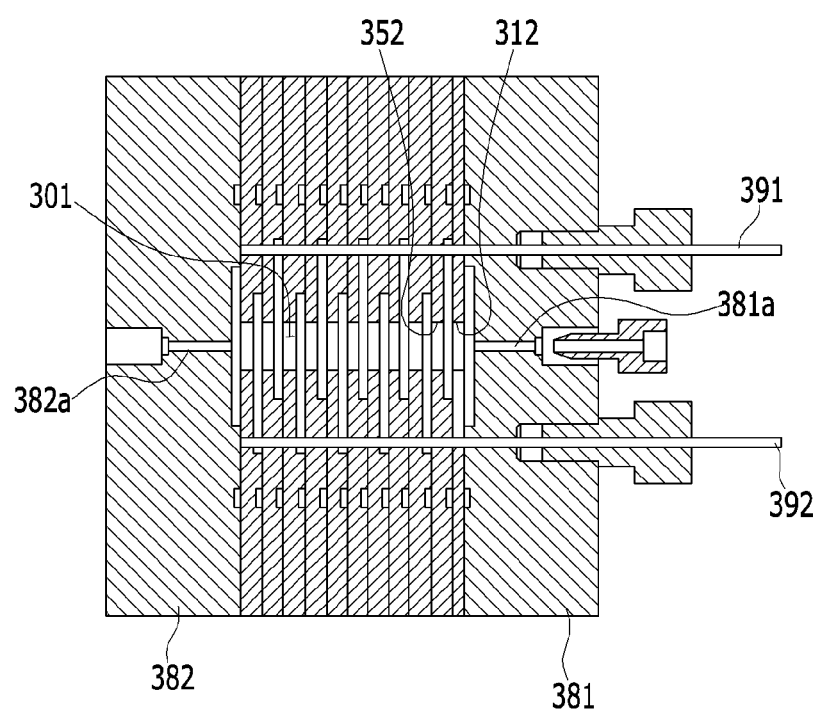
FIG. 8 is a cross-sectional view of the assembled nanoparticle separating apparatus of FIG. 7, taken along the line VIII-VIII.

FIG. 8 is a cross-sectional view of the nanoparticle separating apparatus of FIG. 7, taken along the line VIII-VIII.

Referring to FIG. 8, the openings 321 and 352 of the layered unit support plates 310 and 350 form a channel 301, and the first and second connection blocks 381 and 382 respectively have an inlet 381a and an outlet 382a and communicate with the channel 301. Through-holes 381b and 381c in which the electrode holders 391 and 392 are inserted are formed in the first connection block 381, and through-holes 381b and 381c are aligned with the engaging holes 331a and 371a of the unit support plates 310 and 350 such that the wire-shaped electrode holders 391 and 392 are inserted and then fixed thereto. In the left and right of the channel 301, the electrode holders 391 of the negative electrode electrically connect the negative unit support plates 310, and the electrode holders 392 of the positive electrode electrically connect the positive unit support plates 350.

That is, the protrusions 351 of the electrode members 330 provided in the layered negative unit support plates 310 are arranged to face the same direction, and the electrode holders 391 of the negative electrode are put through the engaging holes 331a formed in the protrusions 331 of the electrode members 330 to connect the plurality of negative unit support plates 310. Further, the protrusions 317 of the electrode members 370 provided in the layered positive unit support plates 350 are arranged facing the same direction, and the electrode holders 392 of the positive electrode are put through the engaging holes 371a formed in the protrusions 371 of the electrode members 370 to connect the plurality of positive unit support plates 350. Since the protrusions 331 of the electrode members 330 of the negative electrode and the protrusions 317 of the electrode members 370 of the positive electrode face opposite directions with respect to the openings 312 and 352, the electrode holders 391 of the negative electrode and the electrode holders 392 of the positive electrode can be separately disposed at lateral sides of the channel 301.

Figure 9:
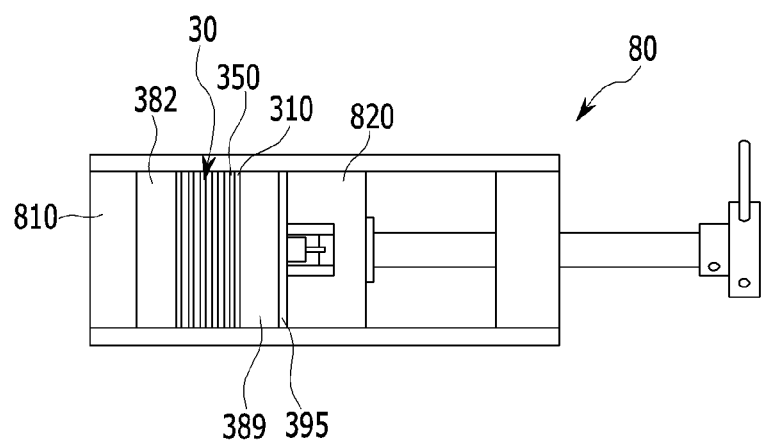
FIG. 9 and FIG. 10 are a top plan view and a side view, respectively, of a nanoparticle separating apparatus combined by a vise according to another exemplary embodiment of the present invention.
Figure 10:
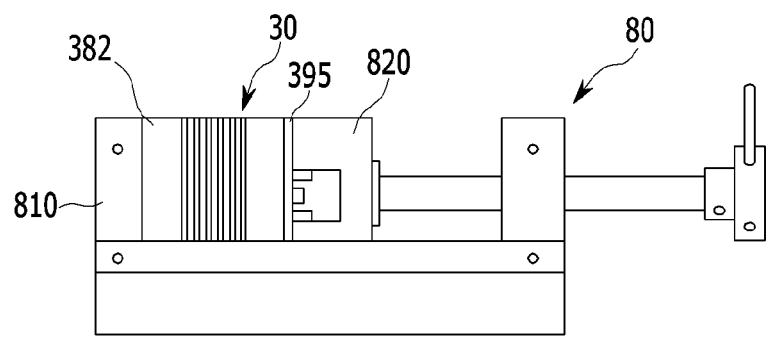

FIG. 9 and FIG. 10 are respectively a top plan view and a side view illustrating that a nanoparticle separating device according to another exemplary embodiment of the present invention is combined by a vise.

Referring to FIGS. 9 and 10, a vise 80 may be used to rigidly fix a nanoparticle separating apparatus 30 according to the present exemplary embodiment.

First, a plurality of layered unit support plates 310 and 350 are aligned by putting two or more alignment holders (not shown) through through-holes 318 and 358 formed in corners of each unit support plate, and then the unit support plates 310 and 350 layered between a stopper 810 and a slider 820 of the vise 80 and first and second connection blocks 381 and 382 combined to the unit support plates 310 and 350 are located. The layered unit support plates 310 and 350 may be combined by applying pressure generated by moving the slider 820. Alternatively, the combination may be finished by fixing the lateral ends of the alignment holders using bolts and nuts. A metallic plate 395 may be disposed in an outer surface of the first connection block 381. Since the metallic plate 395 has higher mechanical strength compared to a material of the unit support plates 310 and 350 and the first connection block 381, damage to the unit support plates 310 and 350 due to the pressure applied by the slider 820 of the vise 80 can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the true protective scope of the present invention should be determined by the appended claims.

What is claimed is:
1. A nanoparticle separating apparatus comprising:
   a body portion having an inlet hole into which a nanoparticle dispersion flows formed in one side thereof, an outlet hole through which the waste solution from which nanoparticles are separated flows formed in the other side, and a hollow channel formed between the inlet hole and the outlet hole;
   a first electrode and a second electrode, each having a porous structure where a plurality of pores are formed, and at least one pair of the first and second electrodes being provided in the channel; and
   a power supply applying voltages, each having a different polarity, to the first electrode or to the second electrode,
   wherein the size of pores in the first electrode and the second electrode are greater than the size of nanoparticles included in the nanoparticle dispersion.

2. The nanoparticle separating apparatus of claim 1, wherein the first electrode and the second electrode are made of a metal foam.

3. The nanoparticle separating apparatus of claim 1, wherein the metal foam is made of at least one of copper (Cu), nickel (Ni), aluminum (Al), and stainless steel.

4. The nanoparticle separating apparatus of claim 1, wherein the first electrode and the second electrode are respectively provided in plural, and the first electrodes and the second electrodes are alternately arranged.

5. A nanoparticle separating apparatus comprising:
   a body portion having an inlet hole into which a nanoparticle dispersion flows formed in one side thereof, an outlet hole through which the waste solution from which nanoparticles are separated flows formed in the other side, and a hollow channel formed between the inlet hole and the outlet hole;
   a first electrode and a second electrode, each having a porous structure where a plurality of pores are formed, and at least one pair of the first and second electrodes being provided in the channel;
   a power supply applying voltages, each having a different polarity, to the first electrode or to the second electrode; and
   an ultrasonic wave generator giving ultrasonic vibration to the first electrode or the second electrode.

6. A nanoparticle separating apparatus comprising:
   a body portion having an inlet hole into which a nanoparticle dispersion flows formed in one side thereof, an outlet hole through which the waste solution from which nanoparticles are separated flows formed in the other side, and a hollow channel formed between the inlet hole and the outlet hole;
   a first electrode and a second electrode, each having a porous structure where a plurality of pores are formed, and at least one pair of the first and second electrodes being provided in the channel; and
   a power supply applying voltages, each having a different polarity, to the first electrode or to the second electrode,
   wherein the body portion comprises a plurality of layered unit support plates, and each of the unit support plates is provided with a perforated opening to form the channel.

7. The nanoparticle separating apparatus of claim 6, wherein the unit support plate comprises an electrode member insertion groove formed in an area including the opening, and an electrode member of the first electrode or an electrode member of the second electrode are installed to the electrode member insertion groove.

8. The nanoparticle separating apparatus of claim 7, further comprising a spacer formed to surround an outer edge of the electrode member insertion groove and an O-ring fitted into a groove that forms a closed curved line along the edge of the spacer.

9. The nanoparticle separating apparatus of claim 7, wherein the electrode member of the first electrode and the electrode member of the second electrode have porous structures where a plurality of pores are formed in portions corresponding to the openings.

10. The nanoparticle separating apparatus of claim 7, wherein the unit support plates comprise a first unit support plate where the electrode member of the first electrode is installed and a second electrode unit support plate where the electrode member of the second electrode is installed, and the electrode member of the first electrode and the electrode member of the second electrode respectively comprise protrusions protruding toward opposite directions with respect to the opening.

11. The nanoparticle separating apparatus of claim 10, wherein the first electrode unit support plate and the second electrode unit plate support are respectively provided in plural, and the first electrode unit support plates and the second electrode unit support plates are alternately arranged.

12. The nanoparticle separating apparatus of claim 10, comprising a first electrode holder connecting the protrusions of the electrode members of the first electrodes and a second electrode holder connecting the protrusions of the electrode members of the second electrodes.

13. The nanoparticle separating apparatus of claim 6, wherein the body portion comprises a first connection block having an inlet at one outermost side of the plurality of layered unit support plates, and a second connection bock having an outlet at the other outermost side.

* * * * *